United States Patent [19]

Hogan

[11] Patent Number: 4,541,446

[45] Date of Patent: Sep. 17, 1985

[54] IN-GROUND CONTROL UNIT FOR WATERING SYSTEMS

[76] Inventor: Frank C. Hogan, P.O. Box 148, Mesa, Ariz. 85201

[21] Appl. No.: 480,903

[22] Filed: Mar. 31, 1983

[51] Int. Cl.[4] ............... G01F 23/24; F17D 3/00
[52] U.S. Cl. ................................. 137/2; 137/78.2; 137/392; 239/65; 417/36; 73/304 R
[58] Field of Search ............ 137/15, 78.2, 312, 392, 137/2; 239/63, 64, 65; 417/12, 36; 73/304 R

[56] References Cited

U.S. PATENT DOCUMENTS

| | | | |
|---|---|---|---|
| 2,776,860 | 1/1957 | Griffis | 239/65 |
| 2,991,938 | 7/1961 | Norcross | 239/65 |
| 3,118,606 | 1/1964 | Rotunda | 137/78.2 |
| 3,140,720 | 7/1964 | Griswold | 137/78.2 |
| 3,297,254 | 1/1967 | Coffman | 239/63 |
| 3,337,418 | 8/1967 | Halacy, Jr. | 137/312 |
| 3,500,844 | 3/1970 | Sanner | 137/78.2 |
| 3,823,874 | 7/1974 | Krocek | 239/65 |
| 3,847,351 | 11/1974 | Hasenbeck | 239/63 |
| 4,130,382 | 12/1978 | Bode | 137/392 |
| 4,313,457 | 2/1982 | Cliff | 137/312 |

*Primary Examiner*—George L. Walton
*Attorney, Agent, or Firm*—Gregory J. Nelson

[57] ABSTRACT

An in-ground control system to override an automatic sprinkling system during periods of excess rain or moisture, having a housing with a peripheral water collection trough connected to a collection chamber. Sensors are positioned in the chamber and upon a predetermined rise in the water level in the chamber will either operate a control to suspend operation of the watering system or to operate a pump to carry away excess water.

6 Claims, 4 Drawing Figures

IN-GROUND CONTROL UNIT FOR WATERING SYSTEMS

This invention generally relates to irrigation and sprinkling systems and more particularly to an in-ground sensing and control system for the operation of such watering systems.

In the proper care of landscaping such as lawns and shrubbery, it is necessary to sprinkle or irrigate the area in order to provide the necessary moisture. While it is necessary that the lawn be sprinkled or irrigated periodically for proper care, it is also necessary that excess water not be provided. Excess water can cause damage to the plants as a result of mildew, root-rot and carrying away of necessary nutrients in the soil.

Excess watering can occur when rain has occured during the normal watering periods. Many lawn watering systems utilize various time operated sprinklers which automatically turn on to provide the necessary water. This is particularly true in commercial installations such as large commercial landscaped areas and areas such as golf courses. The controllers or timers automatically turn on the system to operate for a predetermined time regardless of soil moisture and weather conditions. Generally, the only way to render such control devices inoperative or to change the watering cycle is to re-set the master time clock. This requires manual control and the attention of an operator. An attendant is not always readily available to modify the operation of an automatic system in response to an oversupply of water usually resulting from a rain storm.

To meet this problem various collection and control devices for shutting off an irrigation pump when a predetermined amount of rainfall occurs are found in the prior art. Generally these involve devices which use a simple open collection cup. Typical of these devices are devices shown in U.S. Pat. Nos. 4,130,382 and 3,823,874. These devices are not particularly adaptable for a large irrigation system such as those used in golf courses and other such areas. Further, since the devices utilize a simple cup, they are not readily adapted to sense rapid accumulation or sheet water conditions in low-lying areas. Further, since a relatively small collection chamber is provided, the water sample obtained is not representative of an excess water condition over a substantial area and may therefore give a false reading.

Other types of sensors involve that diffusion sensors or soil moisture sensors which are placed at the soil surface or imbedded in the soil. Typical of these are the device shown in U.S. Pat. Nos. 3,847,351 and 3,553,481. Such devices while effective are expensive and subject to maintenance problems.

Accordingly, it is a primary object of the present invention to provide an in-ground control system which will override an automatic sprinkling system to turn a sprinkling system off when periods of excess moisture are present, such as during a rain storm. The in-ground control system may also be used to control the operation of a pumping system or valve for carrying away of excess moisture.

One condition that results from a rapid accumulation of water due to a rain storm is a condition known as sheet water. Sheet water is a general term used to designate a rapid layer-like accumulation of water particularly in low-lying areas. The formation of sheet water causes rapid accumulation of moisture in excess of that which the soil can absorb.

Briefly, the present invention embodies an in-ground control unit for monitoring sheet water conditions and for overriding automatic watering systems which may be sprinkling systems or systems for pumping away excess water. The invention comprises a housing adapted for placement in the ground. The housing includes an upper surface adapted to collect water over a relatively wide area. The collected water is directed to a collection chamber. A pair of sensing electrodes are placed in the collection chamber. The electrodes are adapted to sense high and low-level water conditions. Upon occurrence of sheet water or flooding, surface water is directed to the collection container. Once the electrodes are immersed, a relay or control device is actuated to either suspend the operation of the watering system or to actuate a pump and valve system to carry away excess water, particularly in low-lying levels. The water is allowed to drain from the interior of the housing and the collection chamber through the open bottom of the housing which is generally covered with a suitable porous media.

Other objects of the present invention reside in the simplicity of construction, ease of installation and adaptability for mounting in various watering systems.

The above together with other objects and advantages which will become subsequently apparent as more fully described and claimed, reference being had to the accompanying drawings wherein numerals refer to like parts throughout and in which:

Figure 1:
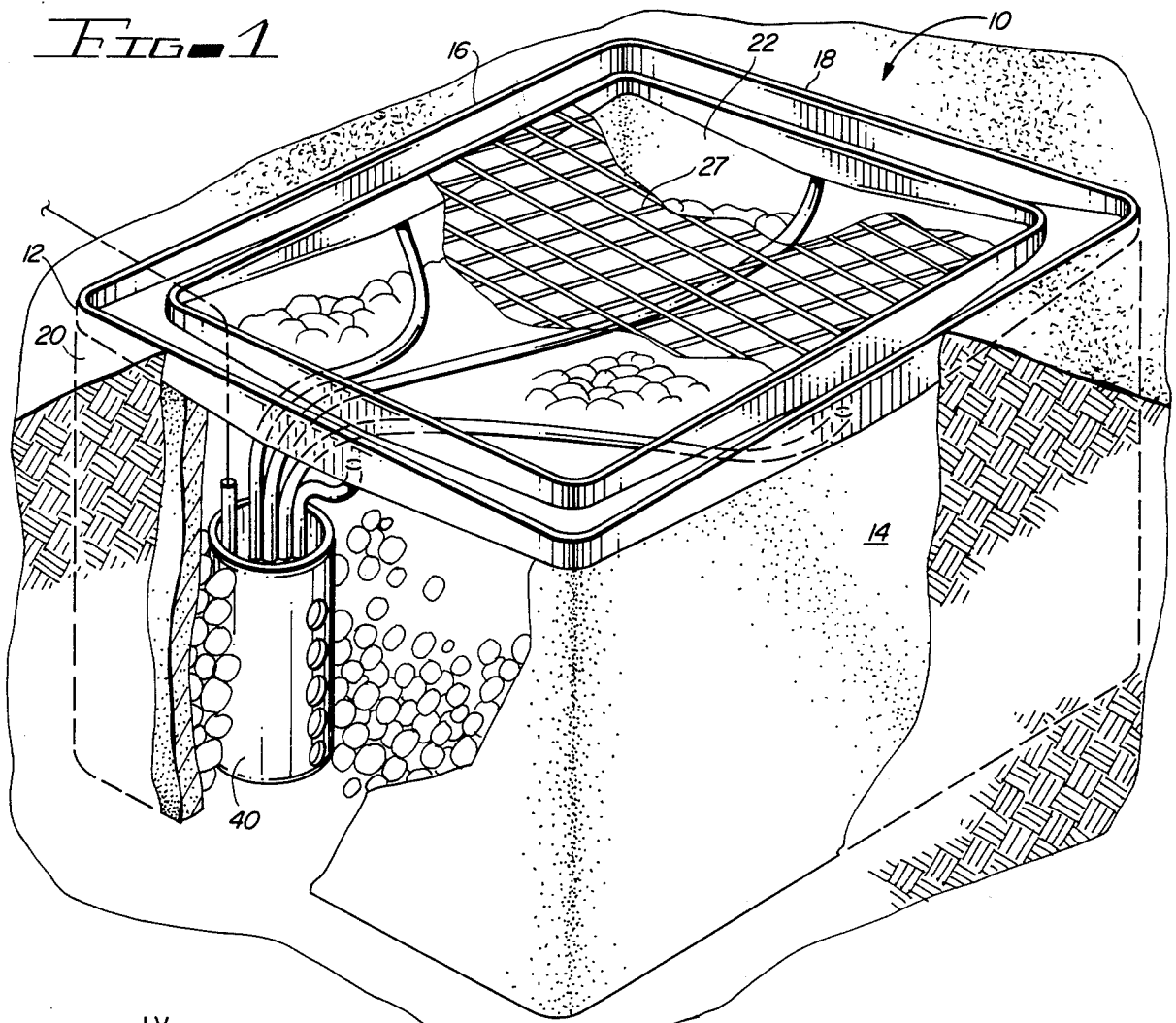
FIG. 1 is a perspective view of the preferred form of the control unit of the present invention.
Figure 2:
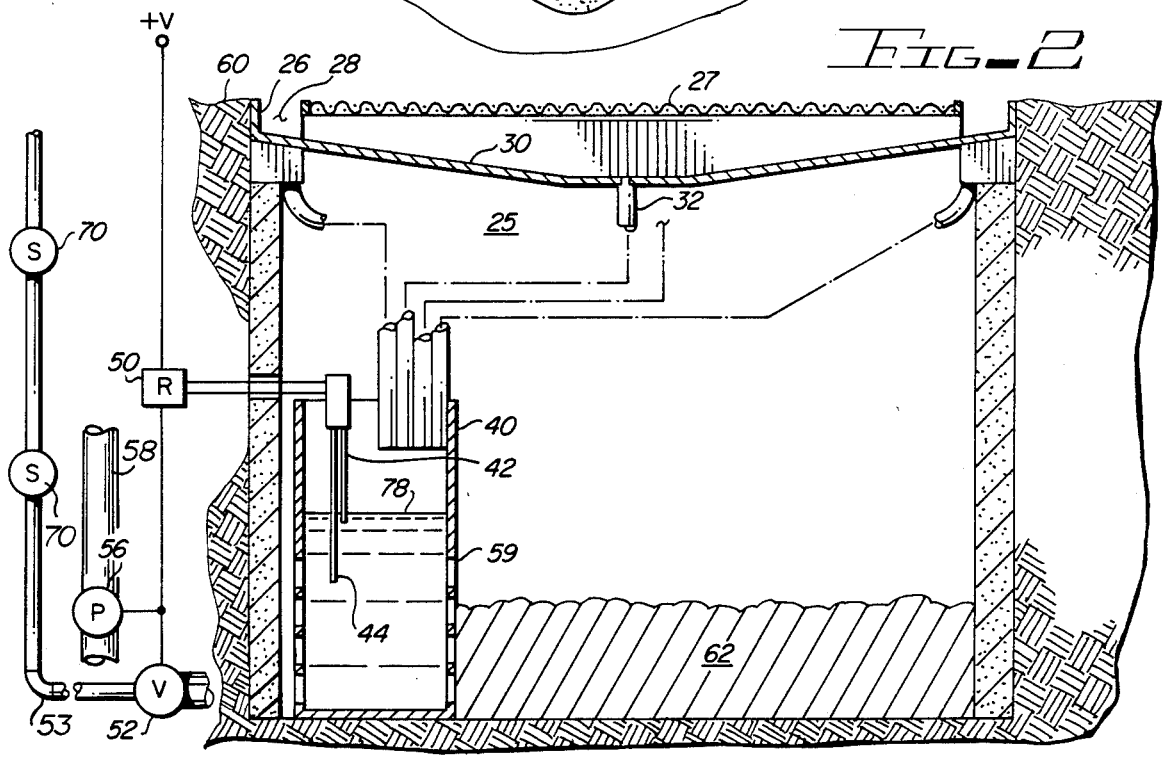
FIG. 2 represents a cross-sectional view of the control unit of FIG. 1.

Turning now to the drawings, particularly FIGS. 1 and 2, the numeral 10 generally designates a control system of the present invention which comprises a rectangular housing 12 having opposite side walls 14 and 16 and end walls 18 and 20 which define an open bottom 21 and an open top 22 and interior chamber 25. Cover plate 26 rests or engages the top edges of walls 14, 16, 18 and 20 and includes a peripherally extending channel or trough 28 extending along the top edge of each of the walls having four sections, one along each of the walls. An open grating 27 extends across the control opening in the cover plate. Preferably, each section of the channels or collection troughs has a sloping floor portion 30 which increases to the greatest depth at the approximate mid-point. At the approximate mid-point location, a tubing member 32 communicates with the channel or trough at one end. The opposite end of the tube 32 communicates with collection container 40 positioned within the housing interior 25.

A pair of electrodes 42 and 44 depend within container 40. Electrode 42 is shorter than electrode 44. Each of the electrodes is connected to a suitable control box 50 which may be remotely located from the in-ground unit. When both of the electrodes 42 and 44 are immersed in water, an electrically conductive path is provided which actuates a relay or other control element within the control box to close valve 52. Valve 52 is provided in the supply line 53 of the irrigation or sprinkling system so that any sprinkling or irrigation operations at sprinkling heads 70 are terminated when the valve is closed.

In addition, control unit 50 may also serve to actuate the pump 56. Pump 56 is connected to suction line 58 adapted to draw water from selected locations in the area covered by the system. Particularly, suction line 58 may be connected to appropriate sumps located in low spots in the controlled area so excess water is carried away.

The control circuitry within control box 50 is well-known to those in the art. The system may be a conventional system or may be a solid state system. Typically, of such solid state systems is that shown in U.S. Pat. No. 4,131,382.

Collection container 40 is generally cylindrical and is provided with a plurality of orifices 59 in the side wall. The size of the orifices 59 is selected to drain the water from the interior of the container at a controlled rate. As soon as the water level within the collection container 40 drops so that both the electrodes 42 and 44 are no longer immersed, control 50 is de-actuated, again allowing valve 52 to open and in the event the circuit is also connected to a pump, permitting the pump 56 to become de-energized.

In operation, the in-ground control system of the present invention is placed in an appropriate location in the area serviced by the irrigation or sprinkling system. Preferably, an in-ground unit is placed at a low condition where flooding will first occur. The housing 12 is placed in an excavation 60 at an appropriate location in the area or zone covered by the particular water system. Preferably the location is selected at a low-spot where water will accumulate initially on the occurence of heavy rains. The control unit 10 is placed in the ground with the upper surface of the peripheral collection channels 28 located at ground level. The interior sump area 25 is partially filled with gravel 62 or other porous media which allows water passing through gate 27 to filter downwardly into the ground. If, for example, the control system is connected through control unit 50 to override electric solenoid valve 52, the system operates in the following manner: Valve 52 controls the supply of water to various sprinklers 70 which serve to provide water to the controlled area. In the event an unusually heavy rain occurs during the sprinkling period, the system will serve to shut valve 52 off to prevent unnecessary waste of water and to reduce flooding. Upon the occurence of heavy rain the water will tend to move to the lower area. Particularly heavy rain will result in the phenomena termed "sheet water" in which a rapid sheet-like accumulation occurs and moves to the low spots. Such accumulation will find its way to the sump location and part of the water will be directed to the peripheral collection channels 28. From the peripheral channels 28 the water will flow through the collection tubes 32 into the collection container 40. When the collection container 40 is filled to a level 78 as seen in FIG. 2, both electrodes 42 and 44 are then immersed and a conductivity path is established which actuates the control unit 50. Control unit 50 will, in turn, serve to send an electric signal to solenoid valve 52 to cause the valve to close if it is in the open position. This will terminate any sprinkling operation. The closed condition will remain as long as the electrodes are submerged. Similarly, pump 56 will be actuated to carry away any excess water particularly in low spots.

When the flooding conditions terminate, water in the collection chamber 40 will slowly drain out by orifices 59. This will lower the water level 78 until the electrodes are no longer immersed which will allow the valve to open and resume normal operation under the influence of the master timer or other control. Water entering through grate 27 as well as overflow from container 40 passes through porous media 62 into the ground below.

Figure 3:
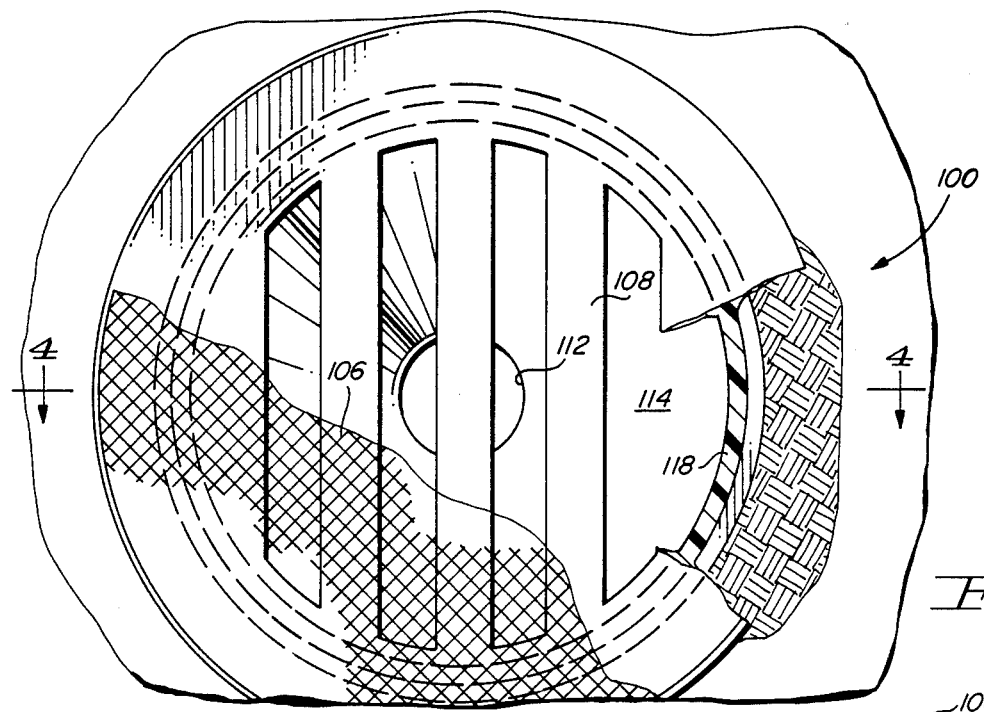
FIG. 3 is a plan view of another embodiment of the present invention.
Figure 4:
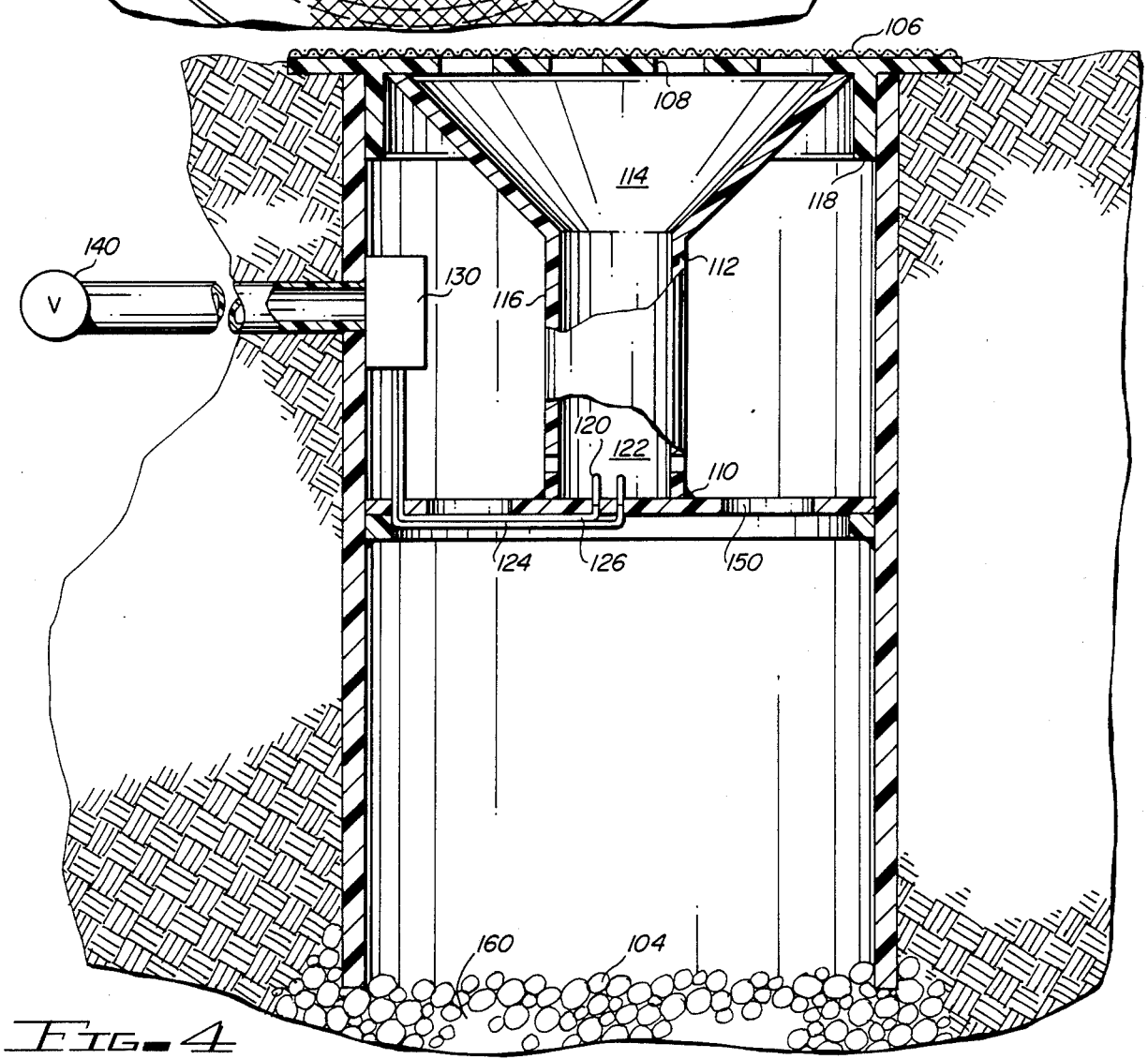
FIG. 4 is a sectional view taken generally along lines 4—4 of FIG. 3.

FIGS. 3 and 4 show another embodiment of the present invention which is generally designated by the numeral 100. The unit includes a generally cylindrical housing 102 having an open bottom 104 and a top partially enclosed by grate 106 having openings 108 extending therein. Transverse partition 110 extends within housing 102 at an elevation below grate 106. A funnel member 112 has a conical section 142 and an axially extending tube member 166 which terminates at partition 110. The upper divergent end of the conical section 114 extends to the undersurface of grate 106. Note that grate 106 may include a generally circular flange 118 which fits within the internal diameter of housing 102 to permit removal and access to the interior of the housing. A pair of electrodes 120 and 122 extend into the bottom portion of tube 116 a pre-determined distance. The electrodes are connected via lines 124 and 126 to controller 130. Controller 130, in turn, is connected to operate electrically operated solenoid valve 140. Orifices 142 are provided at a pre-determined elevation within lower end of tube portion 116. Similarly, transverse partition 110 is provided with drain openings or holes 150.

As has been described with reference to previous figures, the collection device is placed in a suitable location in the ground with the upper surface of the grate corresponding to the surface of the ground at a low location. Appropriate porous media such as gravel 160 may be placed at the bottom of the housing to facilitate drainage. Upon the occurence of a flooding condition, water will flow through the grate and funnel to the bottom of the funnel and upon a pre-determined rise of the water level in the lower portion of the funnel 116, both electrodes 120 and 122 will complete an electrical circuit to actuate controller 130. Upon actuation of controller 130, a suitable relay in the circuit will serve to send a signal to electric operator valve 140 to close the valve and maintain the valve in the closed position as long as the electrodes are fully submerged.

From the foregoing it will be seen the present invention provides an effective collection and control device which will serve to regulate the operation of pumps and valves in water supply systems to conserve water and to prevent either operation of a sprinkling system during rain periods or to actuate other devices to carry excess water.

It will be obvious to those skilled in the art to make various modifications and changes to the specific embodiments of the invention described herein without departing from the spirit and scope of the appended claims.

I claim:

1. An in-ground rain actuated automatic control system for a water distribution system having a control element, said control system comprising:
   (a) a housing having open upper and lower ends and adapted to be placed in an in-ground position in an irrigation area;
   (b) water collection means extending at least substantially about the periphery of the upper end of the housing;
   (c) a collection chamber located within said housing, said collection chamber being in continuous and direct communication with the subjacent soil area through said open lower end;

(d) conduit means communicating said water collection means with said collection chamber;

(e) sensing means adapted to sense a pre-determined water level in said collection chamber; and (f) control means operatively connected to said sensing means and responsive to said pre-determined level to send a control signal to said control element for controlling the water distribution in the irrigation area through the water distribution system whereby said collection chamber drains directly through the subjacent soil to control water distribution in relation to the percolation rate of the soil.

2. The control system of claim 1 wherein said water collection means comprises a cover member on said housing having a peripherally extending channel for receiving water and wherein a perforated grate member is provided in said cover to permit excess water to pass into the interior of said chamber.

3. The control of claim 1 wherein said collection member comprises a conical funnel member at the upper end of said housing converging to and discharging into said collection tube.

4. The control system of claim 1 wherein said sensing members are electrodes adapted to establish a path of electrical conductivity when both of said electrodes are submerged.

5. The control system of claim 1 wherein said control element comprises valve means for controlling water distribution and further includes pump means for evacuating water from the area.

6. The method of automatically controlling an area sprinkling system having a solenoid operated control valve for controlling the admission of water into said system, said method comprising:

(a) providing a collection member having an in-ground housing defining an upper and lower open ends;

(b) placing said housing in a pre-selected location where flooding is likely to occur;

(c) providing a substantially peripheral water collection means about the upper end of said housing for collecting a representative sample of water;

(d) directing said collected water to a collection chamber through a conduit means;

(e) detecting the water level in said collection chamber by a sensing means positioned therein and emitting a control signal to said control valve upon establishing a pre-determined water level in said chamber for controlling the admission of water to said sprinkling system; and (f) continuously draining said collection chamber to the subjacent soil via said open lower end of said collection member at a rate directly related to the ability of the soil to percolate water whereby said control signal permits admission of water only when the soil is able to accept further watering.

* * * * *